(12) United States Patent
Nakaya

(10) Patent No.: US 9,400,089 B2
(45) Date of Patent: Jul. 26, 2016

(54) VEHICLE LIGHTING UNIT

(71) Applicant: Stanley Electric Co., Ltd., Tokyo (JP)

(72) Inventor: Yoshiaki Nakaya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 101 days.

(21) Appl. No.: 14/301,687

(22) Filed: Jun. 11, 2014

(65) Prior Publication Data

US 2014/0362596 A1    Dec. 11, 2014

(30) Foreign Application Priority Data

Jun. 11, 2013    (JP) .................. 2013-122950

(51) Int. Cl.

| | |
|---|---|
| *F21V 9/00* | (2015.01) |
| *F21S 8/10* | (2006.01) |
| *F21V 5/00* | (2015.01) |
| *F21V 5/04* | (2006.01) |
| *F21V 7/00* | (2006.01) |
| *G02B 19/00* | (2006.01) |
| *F21Y 101/02* | (2006.01) |

(52) U.S. Cl.
CPC ......... *F21S 48/1291* (2013.01); *F21S 48/1159* (2013.01); *F21S 48/1241* (2013.01); *F21S 48/1266* (2013.01); *F21S 48/1275* (2013.01); *F21S 48/1329* (2013.01); *F21S 48/1388* (2013.01); *F21V 5/008* (2013.01); *F21V 5/04* (2013.01); *F21V 7/0091* (2013.01); *G02B 19/0028* (2013.01); *G02B 19/0061* (2013.01); *F21Y 2101/02* (2013.01)

(58) Field of Classification Search
CPC .............. F21S 48/1159; F21S 48/1241; F21S 48/1266; F21S 48/1275; F21S 48/1291; F21S 48/1329; F21S 48/1388
USPC ........................................... 362/511
See application file for complete search history.

(56) References Cited

U.S. PATENT DOCUMENTS

2014/0036526 A1 *    2/2014    Sato ................... F21S 48/1154
                                                          362/518

FOREIGN PATENT DOCUMENTS

JP    2010-108639 A    5/2010

* cited by examiner

*Primary Examiner* — Andrew Coughlin
(74) *Attorney, Agent, or Firm* — Kenealy Vaidya LLP

(57) ABSTRACT

A vehicle lighting unit can use a light guiding body, and prevent light loss due to the internal reflection of light at the light exiting surface as a result of being guided through the light guiding body. The vehicle lighting unit can include: a light source; a projection lens; and a light guiding body to collect light from the light source near a rear side focal point of the projection lens so as to guide the light to the projection lens. The light guiding body can include a first optical surface that can serve as a light exiting surface through which the light from the light source guided through the light guiding body can exit. The projection lens can include the first optical surface, a second optical surface, and a third optical surface, and be configured to have the rear side focal point located behind the first optical surface.

16 Claims, 9 Drawing Sheets

Reference Example

Reference Example

VEHICLE LIGHTING UNIT

This application claims the priority benefit under 35 U.S.C. §119 of Japanese Patent Application No. 2013-122950 filed on Jun. 11, 2013, which is hereby incorporated in its entirety by reference.

TECHNICAL FIELD

The presently disclosed subject matter relates to vehicle lighting units, and in particular, to a projection type vehicle lighting unit utilizing a light guiding body configured to guide light from a light source to an emission surface to that the light can exit through the emission surface.

BACKGROUND ART

Some conventional projection type vehicle lighting units have been proposed which utilize a light guide body configured to guide light from a light source to an emission surface so that the light can exit through the emission surface for illumination. For example, such vehicle lighting units have been disclosed in Japanese Patent Application Laid-Open No. 2010-108639 (or JP5196314B).

FIG. 1 is a perspective view illustrating a vehicle lighting unit 200 described in Japanese Patent Application Laid-Open No. 2010-108639.

As illustrated in FIG. 1, the vehicle lighting unit 200 described in Japanese Patent Application Laid-Open No. 2010-108639 is a projection type vehicle lighting unit that can include a light source 210 and a light guiding body 220. The light guiding body 220 can be configured by a transparent member, and include: a light incident surface 220a of a semi-spheric recess; a reflection surface 220b configured to reflect light entering the light guiding body 220 through the light incident surface 220a; a light exiting surface 220c configured to cause the light gathered by the reflection surface 220b to exit therethrough; an edge portion 220d; and a flat surface 220e extending from the edge portion 220d and configured to function as a reflection surface. A region of the flat surface 220e at or near the edge portion 220d is subjected to an anti-reflection treatment, wherein the region corresponds to the region A1 between the lines L1 and L3 and the region A2 between the lines L2 and L4 in FIG. 1.

In the vehicle lighting unit 200 with the above configuration, when the spherical aberration is removed from the light exiting surface 220c, the curvature of the light exiting surface 220c is decreased. As a result, as illustrated in FIG. 2A, part of light being guided through the light guiding body 220 can be internally reflected by the light exiting surface 220c to cause loss of light amount. Further, the light that is internally reflected is originally allowed to exit through the light exiting surface 220c to be horizontally diffused for the illumination of right and left portions of the given light distribution pattern. However, as a result of the above internal reflection of light, the illuminance at the right and left portions of the light distribution pattern is disadvantageously decreased.

According to the sign conditions (conditions for removing comma aberration), the improvement of comma aberration requires the principal surface of the light exiting surface 220c near the light source 210 to coincide with (or substantially coincide with) a sphere of which center is located at the rear side focal point $F_{220c}$ of the light exiting surface 220c (so-called, Apollo's circle). However, in the vehicle lighting device 200 with the above configuration, as illustrated in FIG. 2B, even when the spherical aberration is removed, the principal surface of the light exiting surface 220c near the light source 210, or the light exiting surface 220c itself, is largely deviated from the sphere of which center is located at the rear side focal point $F_{220c}$ of the light exiting surface 220c (so-called, Apollo's circle), whereby the comma aberration cannot be improved. As a result, the vehicle lighting unit 200 with the above configuration can generate glare light due to the comma aberration formed above the horizontal line H in the light distribution pattern as illustrated in FIG. 3, meaning that a clear cut-off line cannot be formed.

In order to prevent glare light from being generated above the horizontal line H in the vehicle lighting unit 200 with the above configuration, the region of the flat surface 220e near the edge portion 220d (the region corresponds to the region A1 between the lines L1 and L3 and the region A2 between the lines L2 and L4 in FIG. 1) must be subjected to an anti-reflection treatment, resulting in lowering the light utilization efficiency.

SUMMARY

The presently disclosed subject matter was devised in view of these and other problems and features in association with the conventional art. According to an aspect of the presently disclosed subject matter, a projection-type vehicle lighting unit can use a light guiding body, wherein it is prevented to cause light loss due to the internal reflection of light at the light exiting surface as a result of being guided through the light guiding body.

According to another aspect of the presently disclosed subject matter, a projection-type vehicle lighting unit can use a light guiding body, wherein the spherical aberration can be removed while improving comma aberration.

According to still another aspect of the presently disclosed subject matter, a projection-type vehicle lighting unit can use a light guiding body, the vehicle lighting unit being capable of forming a clear cut-off line in the light distribution pattern without generating glare light caused by comma aberration above a horizontal line in the light distribution pattern and without forming a conventional anti-reflection treatment performed on a certain region of the light guiding body.

According to still another aspect of the presently disclosed subject matter, a vehicle lighting unit can include: a light source; a projection lens having a rear side focal point; and a light guiding body configured to collect light from the light source at or near the rear side focal point of the projection lens so as to guide the light to the projection lens, wherein the light guiding body can include a first optical surface that can serve as a light exiting surface through which the light emitted from the light source and guided through the light guiding body can exit, wherein the projection lens can include at least the first optical surface, a second optical surface, and a third optical surface, and wherein the projection lens can be configured to have the rear side focal point located behind the first optical surface.

According to the above aspect, the vehicle lighting unit that utilizes a light guiding body can prevent light loss due to the internal reflection of light, being guided through the light guiding body, at the first optical surface (or light exiting surface).

This may be because the projection lens can include at least the first optical surface, the second optical surface, and the third optical surface to diffuse the optical power of each optical surface. This can increase the curvature of the first optical surface when compared with the case where the projection lens includes only the first optical surface.

Furthermore, according to the above aspect, it is possible to inhibit the generation of loss of light amount due to the internal reflection of light, being guided through the light guiding body, at the first optical surface (or light exiting surface). As a result of this, the light having passed through the projection lens and projected forward can be diffused in the right and left directions. This can prevent the decrease of illuminance at the right and left portions of the light distribution pattern.

Furthermore, according to still another aspect of the presently disclosed subject matter, in the above vehicle lighting unit according to the above aspect, the first optical surface, the second optical surface, and the third optical surface can be configured such that the spherical aberration of the projection lens is removed and the projection lens can have a principal surface thereof on the light source side being substantially coincide with a sphere of which center is located at or near the rear side focal point.

According to the above aspect, the projection-type vehicle lighting unit utilizing a light guiding body can remove the spherical aberration of the projection lens and also improve the comma aberration.

This is because the projection lens can include at least the first optical surface, the second optical surface, and the third optical surface and the respective optical surfaces can be configured such that the spherical aberration of the projection lens can be eliminated and the principal surface of the projection lens near the light source can coincide with (or substantially coincide with) a sphere of which center is located at the rear side focal point (so-called, Apollo's circle). As used herein, the principal surface of the projection lens can be referred as a locus drawn by intersections between extending lines of a group of light beams, which have passed through the rear side focal point of the projection lens and are incident on the first optical surface, and a group of light beams parallel to the optical axis of the vehicle lighting unit.

Furthermore, according to the above other aspect, the spherical aberration of the projection lens can be eliminated as well as the comma aberration can be improved. As a result, the vehicle lighting unit can form a clear cut-off line in the light distribution pattern without generating glare light caused by comma aberration above a horizontal line in the light distribution pattern and without forming a conventional anti-reflection treatment performed on a certain region of the light guiding body.

The first optical surface can preferably be configured to be an optical surface having a convex curvature protruded in a light emission direction in which the light can exit through the first optical surface, and the second optical surface can preferably be configured to be an optical surface having a concave curvature recessed in the light emission direction.

Furthermore, according to still another aspect of the presently disclosed subject matter, in the above vehicle lighting unit according to the above aspect, the light guiding body can include an edge portion disposed at or near the rear side focal point, for forming a cut-off line in a light distribution pattern formed by the vehicle lighting unit, and a flat portion configured to extend from the edge portion rearward.

According to the above aspect, it is possible to form a light distribution pattern (for example, a low-beam light distribution pattern) including an upper edge formed by the cut-off line defined by the edge portion.

The vehicle lighting unit according to the above aspects can include an additional lens section having a front surface serving as the third optical surface and a rear surface serving as the second optical surface, wherein the projection lens can be configured to include the first optical surface of the light guiding body, and the second optical surface and the third optical surface of the additional lens section.

According to still another aspect of the presently disclosed subject matter, a vehicle lighting unit can include:
a light source having a light emitting device with a light emission surface facing upward;
a light guiding body having an elongated body, and including a light incident surface provided at a lower, rear end of the elongated body, a flat reflection surface provided above the light incident surface around the rear end thereof, and a first optical surface serving as a light exiting surface provided at an opposite end of the elongated body to the rear end thereof, the light source being disposed below the light incident surface to face to the light incident surface so that light emitted from the light source can be incident on the light incident surface, be reflected by the flat reflection surface toward the first optical surface, and exit through the first optical surface;
a lens section having a second optical surface on a rear side thereof and a third optical surface on a front side thereof, the second optical surface being opposite to the first optical surface, wherein
a projection lens can be formed from the first optical surface, the second optical surface, and the third optical surface to have a rear side focal point,
the rear side focal point is disposed behind the first optical surface within the light guiding body, and
the light guiding body is configured to receive the light from the light source to cause the light to be converged at the rear side focal point of the projection lens, and then guide to the first optical surface to cause the light to pass through the first optical surface, the second optical surface, and the third optical surface in order. The present still another aspect can be combined with any other aspects described above.

According to the presently disclosed subject matter, in the projection-type vehicle lighting unit utilizing a light guiding body according to the above aspect, first, it can be inhibited to cause loss of light amount due to the internal reflection of light at the light exiting surface as a result of being guided through the light guiding body. Second, in the projection-type vehicle lighting unit utilizing a light guiding body with the above configuration, the spherical aberration can be removed while improving comma aberration. Third, in the projection-type vehicle lighting unit utilizing a light guiding body with the above configuration, the vehicle lighting unit can form a clear cut-off line in the light distribution pattern without generating glare light caused by comma aberration above a horizontal line in the light distribution pattern and without forming a conventional anti-reflection treatment performed on a certain region of the light guiding body.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights of the presently disclosed subject matter with reference to the accompanying drawings in accordance with exemplary embodiments. In the present specification, the directions of "up (upper)," "down (lower)," "right," "left," "front," and "rear (back)" are defined when the vehicle lighting unit is assumed to be installed in a vehicle body unless otherwise specified.

Figure 1:
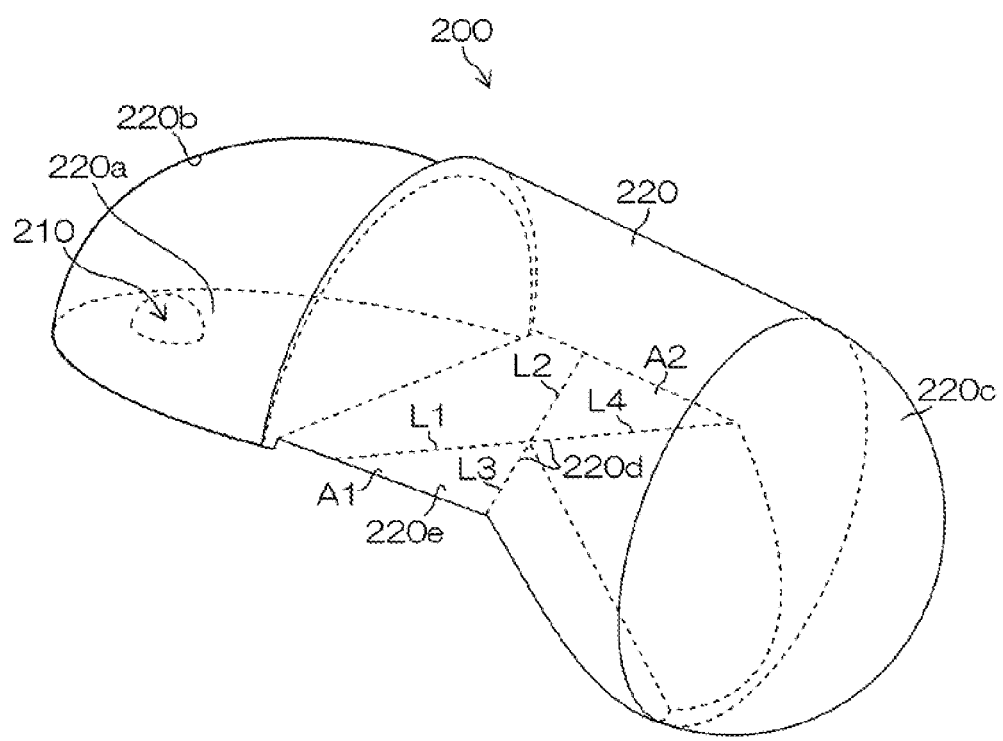
FIG. 1 is a perspective view illustrating a conventional vehicle lighting unit 200.
Figure 2A:
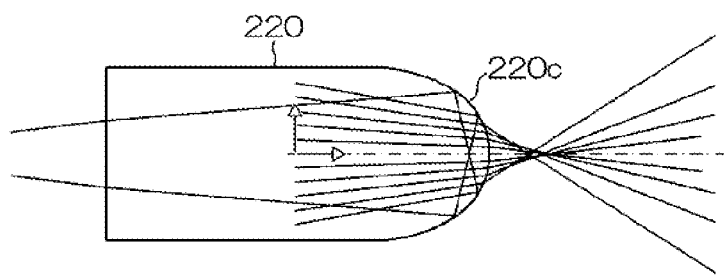
FIG. 2A is a schematic plan view of a light guiding body 220, illustrating how the light guided within the light guiding body 220 is lost by internally reflecting part of light at a light exiting surface 220c.
Figure 2B:
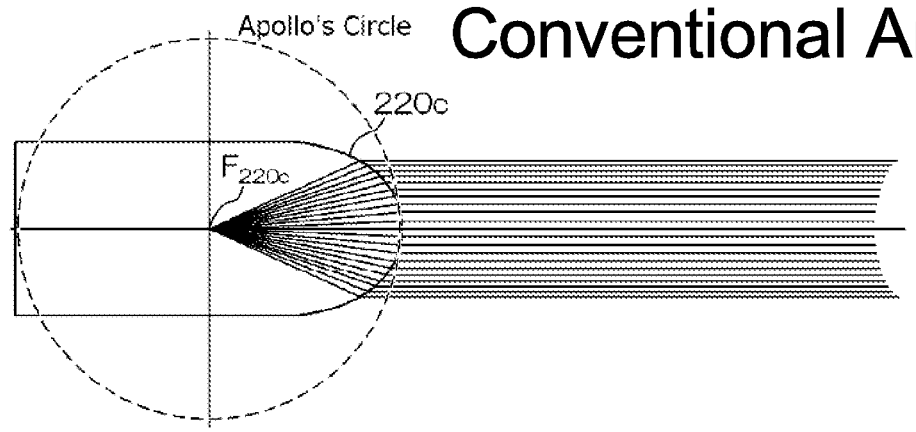
FIG. 2B is a diagram illustrating the relationship between the principal surface of the light exiting surface 220c and an Apollo's circle.
Figure 3:
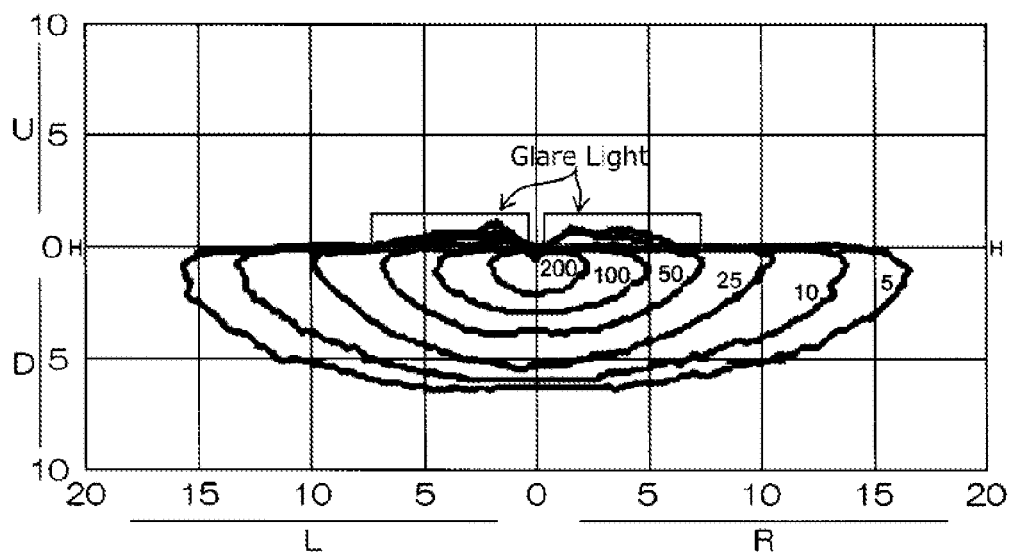
FIG. 3 is a diagram of an example of a light distribution pattern having a cut-off line at its upper edge, the light distribution pattern being formed by light projected from the conventional vehicle lighting unit of FIG. 1 on a virtual vertical screen assumed to be disposed at a position in front of the vehicle lighting unit about 25 meters ahead.
Figure 4:
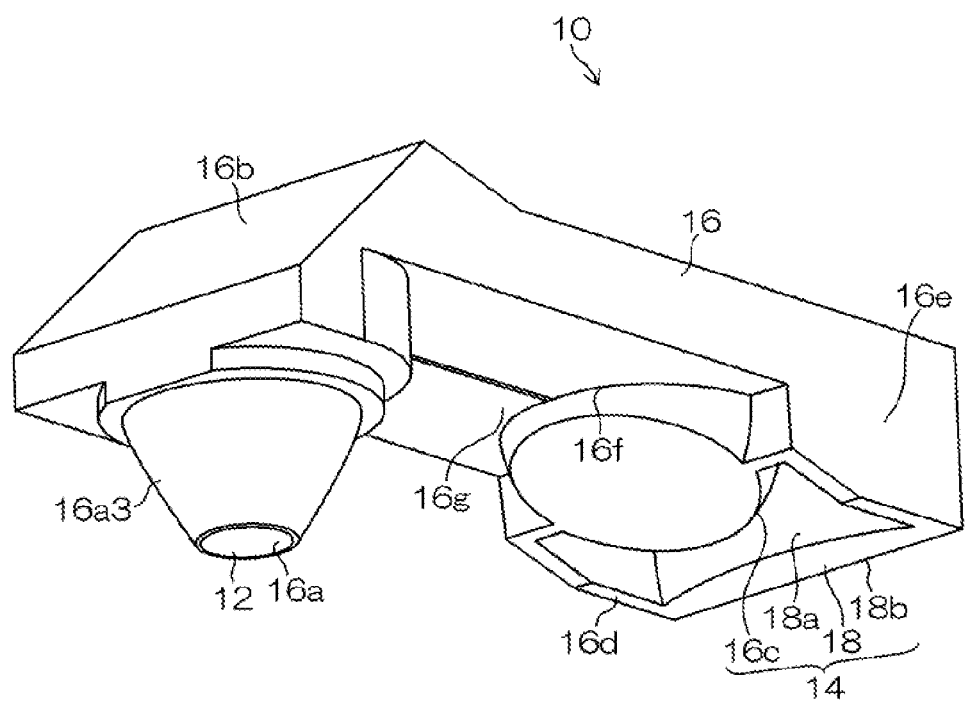
FIG. 4 is a perspective view illustrating a vehicle lighting unit 10 made in accordance with principles of the presently disclosed subject matter.
Figure 5A:
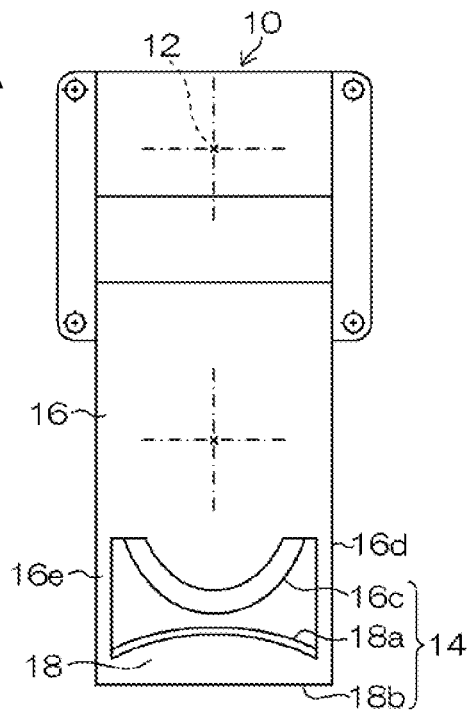
FIG. 5A is a plan view of the vehicle lighting unit 10 of FIG. 4.
Figure 5B:
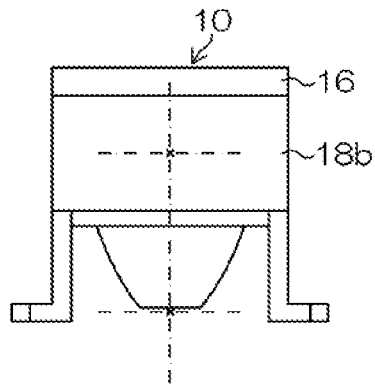
FIG. 5B is a front view of the same.
Figure 5C:
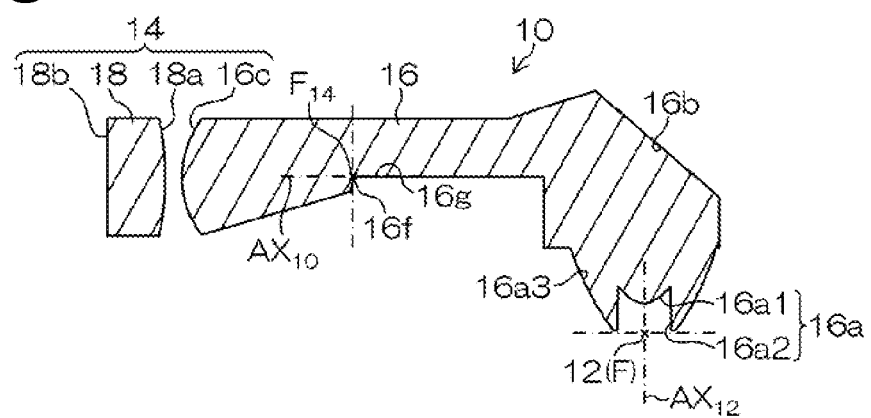
FIG. 5C is a vertical cross-sectional view of the same.

FIG. 4 is a perspective view illustrating a vehicle lighting unit 10 made in accordance with the principles of the presently disclosed subject matter, and FIG. 5A is a plan view of the vehicle lighting unit 10 of FIG. 4, FIG. 5B a front view of the same, and FIG. 5C a vertical cross-sectional view of the same.

As illustrated in FIG. 4 and FIGS. 5A to 5C, the vehicle lighting unit 20 in the present exemplary embodiment can be configured as a projection type vehicle lighting unit including a light guiding body 16, wherein the light guiding body can be configured to guide light from a light source 12 to a light exiting surface or a first optical surface 16c so that the light can exit through the first optical surface 16c. Specifically, the vehicle lighting unit 20 can include the light source 12, a projection lens 14 having a rear side focal point $F_{14}$, the light guiding body 16, and the like.

The light source 12 can be a white light-emitting diode (LED), for example, of about 300 lm, having a light emission portion with a size of about 1 mm×about 2 mm. The light source 12 can be supported by a not-shown substrate fixed to the vehicle guiding body 16 while its light emission portion faces upward in the vertical direction. The directional characteristics of the light source 12 can be that of a Lambertial source. Note that the light source 12 can be a laser diode (LD) or other light source in addition to the white LED.

Figure 6A:
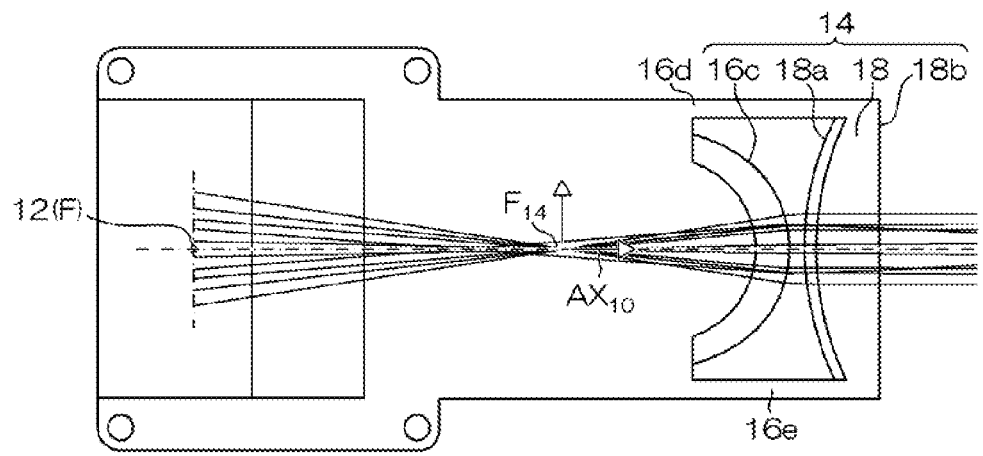
FIG. 6A and FIG. 6B are a plan view and a side view, respectively, illustrating optical paths of light emitted from a light source 12 and guided within a light guiding body 16.
Figure 6B:
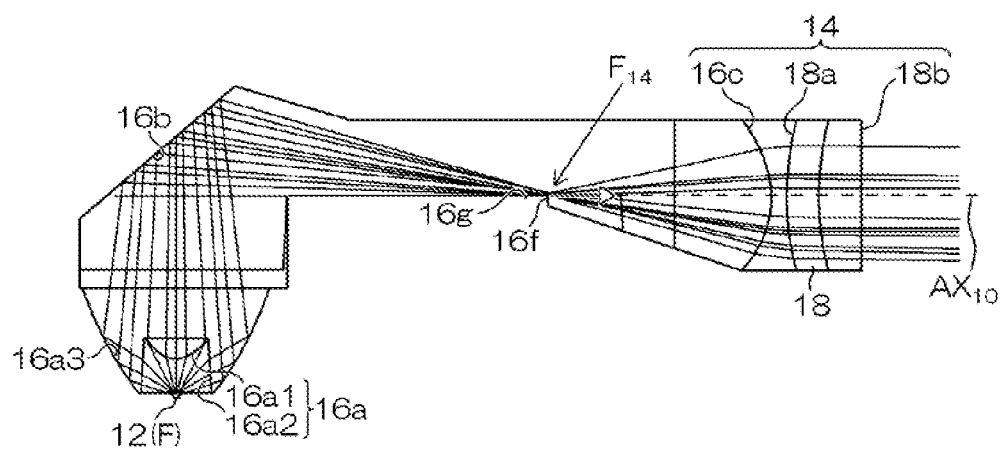

FIG. 6A and FIG. 6B are a plan view and a side view, respectively, illustrating optical paths of light emitted from the light source 12 and guided within the light guiding body 16.

As illustrated in FIGS. 6A and 6B, the light guiding body 16 can receive light from the light source 12 and collect the light at or near the rear side focal point $F_{14}$ of the projection lens 14 to guide the light to the first optical surface 16c (light exiting surface), thereby allowing light to exit through the first optical surface 16c. To achieve this, the light guiding body 16 can be formed from a transparent resin such as an acrylic resin (e.g., PMMA) and a polycarbonate resin (PC). The light guiding body 16 can include a light incident surface 16a, a flat reflection surface 16b, the first optical surface 16c (light exiting surface), and the like. Here, the flat reflection surface 16b can be a total reflection surface configured to achieve total reflection.

As illustrated in FIG. 5C, the light incident surface 16a can include a convex center light incident surface 16a1 and a periphery light incident surface 16a2. The center light incident surface 16a1 can be disposed on an optical axis $AX_{12}$ of the light source 12 in front of the light source 12. The center light incident surface 16a1 is convex toward the light source 12. The periphery light incident surface 16a2 can be configured to extend from the peripheral edge of the center light incident surface 16a1 toward the light source 12, namely, to be formed as a cylindrical surface surrounding the optical axis $AX_{12}$ of the light source 12 in front of the light source 12. The light incident surface 16a can further include a narrowed cylindrical reflection surface 16a3 surrounding the center light incident surface 16a1 and the periphery light incident surface 16a2 from outside. The light incident surface 16a (including the center light incident surface 16a1 and the periphery light incident surface 16a2) can be provided at a lower, rear end portion of the light guiding body 16 and the light source 12 can be disposed below the light incident surface 16a of the light guiding body 16, as illustrated in the drawings. Further, the provision of the flat reflection surface 16b can change the optical paths of light entering the light guiding body 16. This configuration can reduce the size of the light guiding body 16 in the front-to-rear direction.

As illustrated in FIG. 6B, the light emitted by the light source 12 can be incident on the center light incident surface 16a1 to enter the light guiding body 16, and can be totally reflected by the flat reflection surface 16b to be converged at or near the rear side focal point F14 of the projection lens 14. Specifically, the center light incident surface 16a1 can be designed to receive the light from the light source 12 or a virtual point light source positioned at a reference point F and converge the most part of the light at or near the rear side focal point F14 of the projection lens 14.

Further, as illustrated in FIG. 6B, the light emitted by the light source 12 can be incident on the periphery light incident surface 16a2 to enter the light guiding body 16, and can be totally reflected by the cylindrical reflection surface 16a3 surrounding the periphery light incident surface 16a2 and then by the flat reflection surface 16b to be converged at or near the rear side focal point F14 of the projection lens 14. Specifically, the cylindrical reflection surface 16a3 can be designed to receive the light from the light source 12 or a virtual point light source positioned at a reference point F through the periphery light incident surface 16a2 and totally reflect and converge the most part of the light at or near the rear side focal point F14 of the projection lens 14.

The projection lens 14 can be configured to include at least the first optical surface 16c (light exiting surface), a second optical surface 18a, and a third optical surface 18b, and have the rear side focal point $F_{14}$ disposed behind the first optical surface 16c and within the light guiding body 16. Namely, the projection lens 14 can be configured to include part of the light guiding body 16 and an additional lens section 18 disposed in front of the light guiding body 16.

The first optical surface 16c can be formed at a front end portion of the light guiding body 16. The first optical surface 16c can be configured to be an optical surface protruded (convex) in a light emission direction of light exiting through the first optical surface 16c and having a positive curvature. The first optical surface 16c can be optimized to be a polynomial aspheric lens surface having a positive radius of curvature, for example.

The second optical surface 18a can be a rear surface of the additional lens section 18 disposed in front of the first optical surface 16c of the light guiding body 16. The second optical surface 18a can be configured to be an optical surface having a negative curvature (concave) in the light emission direction of light exiting through the first optical surface 16c. For example, the second optical surface 18a can be configured to be a spherical surface having a negative radius of curvature of, for example, 40 mm.

The third optical surface 18b can be a front surface of the additional lens section 18. The third optical surface 18b can be configured to be a flat surface having an infinite radius of curvature, for example, a flat surface perpendicular to an optical axis $AX_{10}$ of the vehicle lighting unit 10. Note that the third optical surface 18b can be configured to be a convex or concave optical surface in the light emission direction in addition to the flat surface.

In the present exemplary embodiment, the additional lens section 18 can be disposed in front of the light guiding body 16 while connected thereto with a pair of right and left connection sections 16d and 16e such that the additional lens section 18 is positioned away from the front end portion (the first optical surface 16c) of the light guiding body 16 with a predetermined gap therebetween. Accordingly, in the present exemplary embodiment, the additional lens section 18 and the light guiding body 16 can be integrally formed via the pair of connection sections 16d and 16e.

Figure 9A:
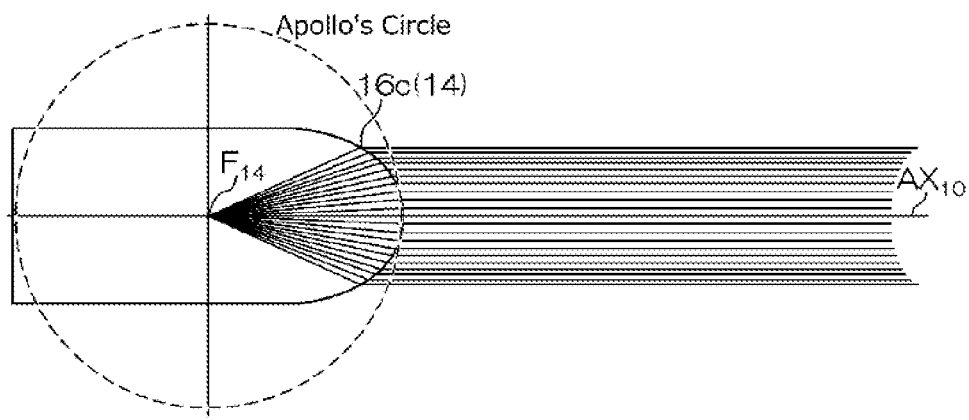
FIG. 9A is a diagram illustrating the relationship between the principal surface of the projection lens 14 and an Apollo's circle when the projection lens 14 is composed of a single optical surface (reference example)
Figure 9B:
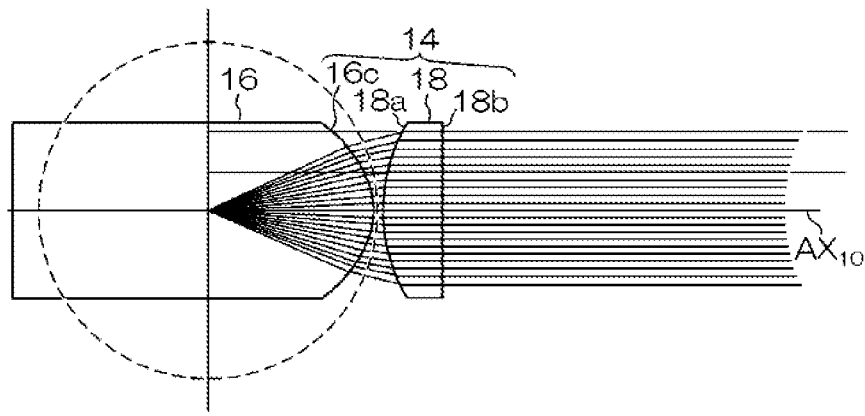
FIG. 9B is a diagram illustrating the relationship between the principal surface of the projection lens 14 and an Apollo's circle when the projection lens 14 is composed of three optical surfaces.

As illustrated in FIG. 9B, the first optical surface 16c, the second optical surface 18a, and the third optical surface 18b can be configured to have respective surface shapes with the spherical aberration of the projection lens 14 having been eliminated. Furthermore, the principal surface of the projection lens 14 near the light source 12 can be configured to coincide with (or substantially coincide with) a sphere of which center is located at the rear side focal point $F_{14}$ of the projection lens 14 (so-called, Apollo's circle). Accordingly, the first optical surface 16c, the second optical surface 18a, and the third optical surface 18b can constitute the function of the projection lens 14 as a whole. As used herein, the principal surface of the projection lens 14 can be a locus drawn by intersections between extending lines of a group of light beams, which have passed through the rear side focal point $F_{14}$ of the projection lens 14 and are incident on the first optical surface 16c, and a group of light beams parallel to the optical axis $AX_{10}$ of the vehicle lighting unit 10, as in FIG. 9B.

The light guiding body 16 can further include an edge portion 16f and a flat portion 16g. The edge portion 16f can be provided at or near the rear side focal point $F_{14}$ of the projection lens 14 so as to form a cut-off line CL in a light distribution pattern. The shape of the edge portion 16f can be a curved edge shape that corresponds to the curvature of field of the projection lens 14. The flat portion 16g can be a total reflection surface and extend from the edge portion 16f rearward (see FIGS. 4 and 5C).

In the vehicle lighting unit 10 with the above configuration, as illustrated in FIGS. 6A and 6B, the light from the light source 12 can be incident on the light incident surface 16a (including the center light incident surface 16a1 and the periphery light incident surface 16a2) to enter the light guiding body 16. The incident light can be reflected by the cylindrical reflection surface 16a3 and the flat reflection surface 16b, and part of the light can be converged to or near the rear side focal point $F_{14}$ of the projection lens 14. The light having passed the rear side focal point $F_{14}$ can be guided to the first optical surface 16c to exit through the first optical surface 16c. Another part of the light can be directly guided to the first optical surface 16c without converged to the rear side focal point $F_{14}$ to exit through the first optical surface 16c. Further another part of the light can be reflected by the flat portion 16g and then guided to the first optical surface 16c to exit through the first optical surface 16c. The light exiting through the first optical surface 16c can pass through the second optical surface 18a and the third optical surface 18b of the additional lens section 18 to be projected forward, thereby forming the light distribution pattern P, such as a low-beam light distribution pattern, having a clear cut-off line CL at its upper edge, the light distribution pattern being formed on a virtual vertical screen assumed to be disposed at a position in front of the vehicle lighting unit 10 about 25 meters ahead, as illustrated in FIG. 7.

The formation of the clear cut-off line CL can be achieved by the following configurations, wherein the spherical aberration of the projection lens 14 can be eliminated; the respective optical surfaces can be configured such that the principal surface of the projection lens 14 near the light source 12 can coincide with (or substantially coincide with) a sphere of which center is located at the rear side focal point $F_{14}$ of the projection lens 14 (so-called, Apollo's circle); and the sign conditions (conditions for removing comma aberration) can be satisfied (or substantially satisfied).

Figure 7:
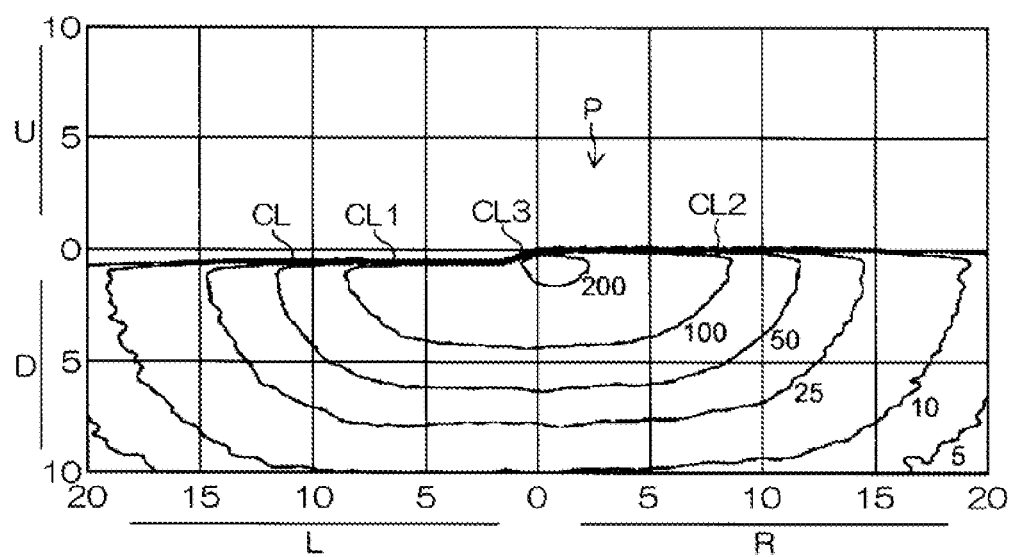
FIG. 7 is a diagram of an example of a light distribution pattern P having a clear cut-off line CL at its upper edge, the light distribution pattern being formed by light projected from the inventive vehicle lighting unit 10 of FIG. 4 on a virtual vertical screen assumed to be disposed at a position in front of the vehicle lighting unit 10 about 25 meters ahead.

Note that the edge portion 16f can be configured to be shaped corresponding to the desired cut-off line CL that can include a left horizontal cut-off line CL1, a right horizontal cut-off line CL2, and a slanted cut-off line CL2 connecting the right and left horizontal cut-off lines CL1 and CL2, as illustrated in FIG. 7. Further, note that the light distribution pattern P can include a step at a road shoulder side by about 0.57 degrees on the virtual vertical screen.

As described above, according to the projection-type vehicle lighting unit 10 that can use the light guiding body 16, the light loss due to the internal reflection of light at the light exiting surface (the first optical surface 16c) as a result of being guided through the light guiding body 16 can be prevented.

Figure 8A:
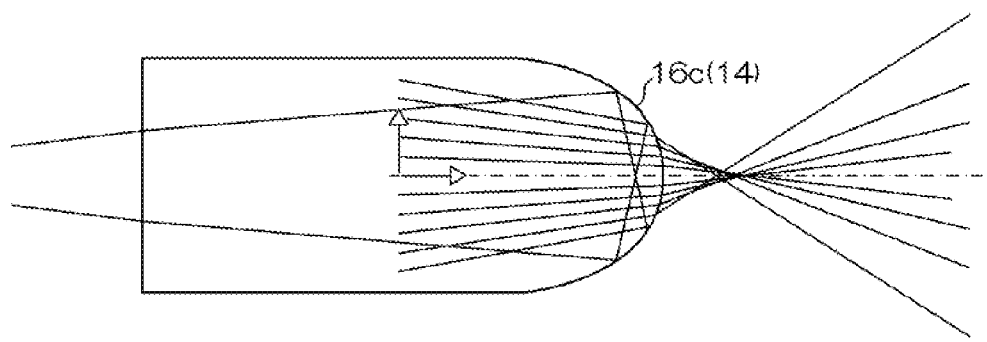
FIG. 8A is a plan view illustrating optical paths of light emitted from the light source 12 and guided within the light guiding body 16 when a projection lens 14 is composed of a single optical surface (reference example)
Figure 8B:
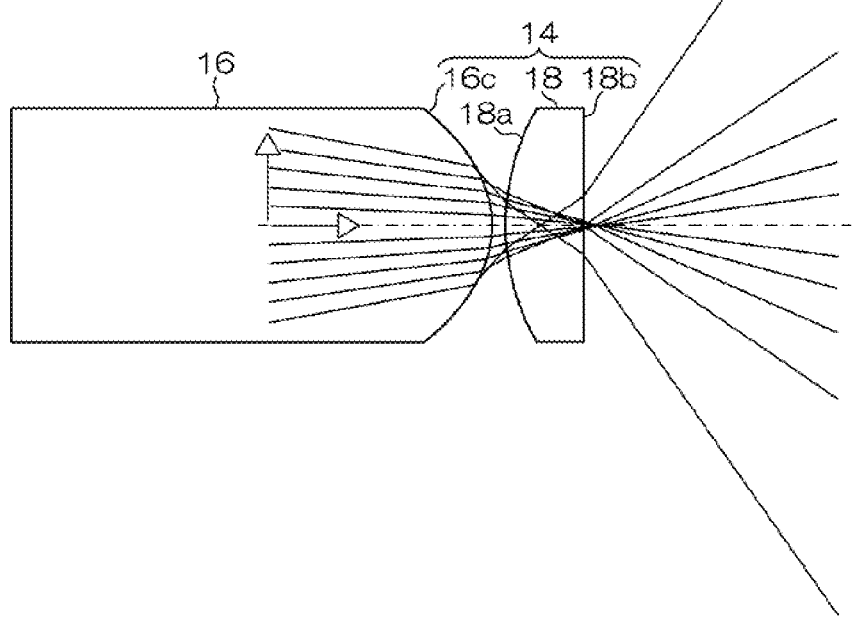
FIG. 8B is a plan view illustrating optical paths of light emitted from the light source 12 and guided within the light guiding body 16 when the projection lens 14 is composed of three optical surfaces.

This may be because the projection lens 14 can include at least the first optical surface 16c, the second optical surface 18a, and the third optical surface 18b to diffuse the optical power of each optical surface 16c, 18a, or 18b. (See FIG. 8B.) This can increase the curvature of the first optical surface 16c when compared with the case where the projection lens 14 includes only the first optical surface 16c (see FIG. 8A).

Furthermore, according to the projection-type vehicle lighting unit 10 of the present exemplary embodiment, it is possible to inhibit the generation of loss of light due to the internal reflection of light, being guided through the light guiding body 16, at the first optical surface 16c (light exiting surface). As a result of this, the light having passed through the projection lens 14 and projected forward can be diffused in the right and left directions. This can prevent the decrease of illuminance at the right and left portions of the light distribution pattern P.

According to the projection-type vehicle lighting unit 10 of the present exemplary embodiment, the projection-type vehicle lighting unit 10 utilizing the light guiding body 16 can remove the spherical aberration of the projection lens 14 and also improve the comma aberration.

This is because the projection lens 14 can include at least the first optical surface 16c, the second optical surface 18a, and the third optical surface 18b and the respective optical surfaces 16c, 18a, and 18b can be configured such that the spherical aberration of the projection lens 14 can be eliminated and the principal surface of the projection lens 14 near the light source 12 can coincide with (or substantially coincide with) a sphere of which center is located at the rear side focal point $F_{14}$ of the projection lens 14 (so-called, Apollo's circle). As illustrated in FIG. 9A, if the projection lens 14 is composed only of the first optical surface 16c, the first optical surface 16c cannot be configured to cause the spherical aberration of the projection lens 14 (or the first optical surface 16c) to be removed and to coincide with a sphere of which center is located at the rear side focal point $F_{14}$ of the projection lens 14 (so-called, Apollo's circle). As used herein, the principal surface of the projection lens 14 (first optical surface 16a) can be a locus drawn by intersections between extending lines of a group of light beams, which have passed through the rear side focal point $F_{14}$ of the projection lens 14 and are incident on the first optical surface 16c, and a group of light beams parallel to the optical axis $AX_{10}$ of the vehicle lighting unit 10 as shown in FIG. 9A, meaning that the principal surface straightforwardly corresponds to the first optical surface 16c itself.

Furthermore, according to the projection-type vehicle lighting unit 10 of the present exemplary embodiment, the spherical aberration of the projection lens 14 can be eliminated as well as the comma aberration can be improved. As a result, the vehicle lighting unit 10 can form a clear cut-off line CL in the light distribution pattern P, for example, as illustrated in FIG. 7, without generating glare light caused by comma aberration above the horizontal line H in the light distribution pattern and without forming a conventional anti-reflection treatment performed on a certain region of the light guiding body 16.

The present exemplary embodiment has been exemplified to a vehicle lighting unit for forming the light distribution pattern P having the clear cut-off line CL at its upper edge. The presently disclosed subject matter can be widely applied to various vehicle lighting units for forming various light distribution patterns, such as a high-beam light distribution pattern, a pedestrian light distribution pattern for illuminating a pedestrian side road, a signal sign light distribution pattern for illuminating a signal sign disposed above or sideward, or the like.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
    a light source;
    a projection lens having a rear side focal point; and
    a light guiding body configured to collect light from the light source at or near the rear side focal point of the projection lens so as to guide the light to the projection lens, wherein
    the light guiding body includes a first optical surface that can serve as a light exiting surface through which the light emitted from the light source and guided through the light guiding body can exit,
    wherein the projection lens includes at least the first optical surface, a second optical surface, and a third optical surface, and
    wherein the projection lens is configured to have the rear side focal point located behind the first optical surface, and
    wherein the first optical surface, the second optical surface, and the third optical surface are configured such that a spherical aberration of the projection lens is removed and the projection lens has a principal surface thereof on a light source side being substantially coincide with a sphere of which center is located at or near the rear side focal point.

2. The vehicle lighting unit according to claim 1, wherein
    the first optical surface is configured to be an optical surface having a convex curvature protruded in a light emission direction in which the light can exit through the first optical surface, and
    the second optical surface is configured to be an optical surface having a concave curvature recessed in the light emission direction.

3. The vehicle lighting unit according to claim 2, wherein the light guiding body includes an edge portion disposed at or near the rear side focal point, for forming a cut-off line in a light distribution pattern formed by the vehicle lighting unit, and a flat portion configured to extend from the edge portion rearward.

4. The vehicle lighting unit according to claim 3, further comprising an additional lens section having a front surface serving as the third optical surface and a rear surface serving as the second optical surface, and wherein
    the projection lens can be configured to include the first optical surface of the light guiding body, and the second optical surface and the third optical surface of the additional lens section.

5. The vehicle lighting unit according to claim 2, further comprising an additional lens section having a front surface serving as the third optical surface and a rear surface serving as the second optical surface, and wherein
    the projection lens can be configured to include the first optical surface of the light guiding body, and the second optical surface and the third optical surface of the additional lens section.

6. The vehicle lighting unit according to claim 1, wherein the light guiding body includes an edge portion disposed at or near the rear side focal point, for forming a cut-off line in a light distribution pattern formed by the vehicle lighting unit, and a flat portion configured to extend from the edge portion rearward.

7. The vehicle lighting unit according to claim 6, further comprising an additional lens section having a front surface serving as the third optical surface and a rear surface serving as the second optical surface, and wherein
    the projection lens can be configured to include the first optical surface of the light guiding body, and the second optical surface and the third optical surface of the additional lens section.

8. The vehicle lighting unit according to claim 1, further comprising an additional lens section having a front surface serving as the third optical surface and a rear surface serving as the second optical surface, and wherein
the projection lens can be configured to include the first optical surface of the light guiding body, and the second optical surface and the third optical surface of the additional lens section.

9. A vehicle lighting unit comprising:
a light source having a light emitting device with a light emission surface facing upward;
a light guiding body having an elongated body, and including a light incident surface provided at a lower, rear end of the elongated body, a flat reflection surface provided above the light incident surface around the rear end thereof, and a first optical surface serving as a light exiting surface provided at an opposite end of the elongated body to the rear end thereof, the light source being disposed below the light incident surface to face to the light incident surface so that light emitted from the light source can be incident on the light incident surface, be reflected by the flat reflection surface toward the first optical surface, and exit through the first optical surface;
a lens section having a second optical surface on a rear side thereof and a third optical surface on a front side thereof, the second optical surface being opposite to the first optical surface, wherein
a projection lens is formed from the first optical surface, the second optical surface, and the third optical surface to have a rear side focal point,
the rear side focal point is disposed behind the first optical surface within the light guiding body, and
the light guiding body is configured to receive the light from the light source to cause the light to be converged at the rear side focal point of the projection lens, and then guide to the first optical surface to cause the light to pass through the first optical surface, the second optical surface, and the third optical surface in order.

10. The vehicle lighting unit according to claim 9, wherein the first optical surface, the second optical surface, and the third optical surface are configured such that a spherical aberration of the projection lens is removed and the projection lens has a principal surface thereof on a light source side being substantially coincide with a sphere of which center is located at or near the rear side focal point.

11. The vehicle lighting unit according to claim 9, wherein
the first optical surface is configured to be an optical surface having a convex curvature protruded in a light emission direction in which the light can exit through the first optical surface, and
the second optical surface is configured to be an optical surface having a concave curvature recessed in the light emission direction.

12. The vehicle lighting unit according to claim 10, wherein
the first optical surface is configured to be an optical surface having a convex curvature protruded in a light emission direction in which the light can exit through the first optical surface, and
the second optical surface is configured to be an optical surface having a concave curvature recessed in the light emission direction.

13. A vehicle lighting unit comprising:
a light source;
a projection lens having a rear side focal point; and
a light guiding body configured to collect light from the light source at or near the rear side focal point of the projection lens so as to guide the light to the projection lens, wherein:
the light guiding body includes a first optical surface that can serve as a light exiting surface through which the light emitted from the light source and guided through the light guiding body can exit;
the projection lens includes at least the first optical surface, a second optical surface, and a third optical surface;
the projection lens is configured to have the rear side focal point located behind the first optical surface;
the vehicle lighting unit further comprises an additional lens section having a front surface serving as the third optical surface and a rear surface serving as the second optical surface;
the projection lens is configured to include the first optical surface of the light guiding body, and the second optical surface and the third optical surface of the additional lens section; and
the second optical surface of the additional lens section is disposed in front of the light guiding body away from the first optical surface of the light guiding body.

14. The vehicle lighting unit according to claim 13, wherein
the first optical surface is configured to be an optical surface having a convex curvature protruded in a light emission direction in which the light can exit through the first optical surface, and
the second optical surface is configured to be an optical surface having a concave curvature recessed in the light emission direction.

15. The vehicle lighting unit according to claim 13, wherein the light guiding body includes an edge portion disposed at or near the rear side focal point, for forming a cut-off line in a light distribution pattern formed by the vehicle lighting unit, and a flat portion configured to extend from the edge portion rearward.

16. The vehicle lighting unit according to claim 13, wherein the light guiding body includes an edge portion disposed at or near the rear side focal point, for forming a cut-off line in a light distribution pattern formed by the vehicle lighting unit, and a flat portion configured to extend from the edge portion rearward.

* * * * *